United States Patent
Zhang et al.

(10) Patent No.: US 12,185,757 B2
(45) Date of Patent: Jan. 7, 2025

(54) CARTRIDGE AND ELECTRONIC CIGARETTE

(71) Applicant: SHENZHEN FIRST UNION TECHNOLOGY CO., LTD., Shenzhen (CN)

(72) Inventors: Yunkai Zhang, Shenzhen (CN); Ruilong Hu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 519 days.

(21) Appl. No.: 17/609,003

(22) PCT Filed: May 6, 2020

(86) PCT No.: PCT/CN2020/088765
§ 371 (c)(1),
(2) Date: Nov. 5, 2021

(87) PCT Pub. No.: WO2020/224590
PCT Pub. Date: Nov. 12, 2020

(65) Prior Publication Data
US 2022/0211107 A1  Jul. 7, 2022

(30) Foreign Application Priority Data

May 7, 2019  (CN) .................. 2019206455930.5

(51) Int. Cl.
*A24F 40/44* (2020.01)
*A24F 40/10* (2020.01)
(Continued)

(52) U.S. Cl.
CPC .............. *A24F 40/44* (2020.01); *A24F 40/10* (2020.01); *A24F 40/42* (2020.01); *A24F 40/46* (2020.01); *A24F 40/485* (2020.01); *H05B 3/06* (2013.01)

(58) Field of Classification Search
CPC ........ A24F 40/44; A24F 40/485; A24F 40/10; A24F 40/46; A24F 40/42; H05B 3/06
(Continued)

(56) References Cited

U.S. PATENT DOCUMENTS

| | | | |
|---|---|---|---|
| 7,726,320 B2 * | 6/2010 | Robinson | A24B 15/167 131/194 |
| 9,277,770 B2 * | 3/2016 | DePiano | A24F 40/46 |

(Continued)

FOREIGN PATENT DOCUMENTS

| | | |
|---|---|---|
| CN | 207040877 U | 2/2018 |
| CN | 108185536 A | 6/2018 |

(Continued)

*Primary Examiner* — Abdullah A Riyami
*Assistant Examiner* — Vladimir Imas
(74) *Attorney, Agent, or Firm* — Proi Intellectual Property US

(57) ABSTRACT

The present application relates to the technical field of smoking sets, and provided thereby are a cartridge and an electronic cigarette, the cartridge comprising: a liquid storage part inside of which a liquid storage cavity is formed; a gas outlet channel; a porous body which comprises a main body having an atomizing surface, and two side parts arranged opposite to each other; and a container is defined and formed between the two side parts and the main part. The porous body also comprises a connection part which is used to connect the two side parts, used to receive and absorb condensed liquid formed in the gas outlet channel, (Continued)

and has at least one receiving surface facing towards the gas outlet channel; and a heating body which is bound to the atomizing surface.

19 Claims, 8 Drawing Sheets

(51) Int. Cl.
*A24F 40/42* (2020.01)
*A24F 40/46* (2020.01)
*A24F 40/485* (2020.01)
*H05B 3/06* (2006.01)

(58) Field of Classification Search
USPC ............................................ 131/329
See application file for complete search history.

(56) References Cited

U.S. PATENT DOCUMENTS

| | | | |
|---|---|---|---|
| 9,839,237 B2 * | 12/2017 | Chang | A24F 40/44 |
| 9,861,138 B2 | 1/2018 | Liu | |
| 9,918,495 B2 * | 3/2018 | DePiano | F22B 1/282 |
| 9,974,334 B2 * | 5/2018 | Dooly | A24F 40/40 |
| 10,085,485 B2 * | 10/2018 | Hunt | A61M 15/0021 |
| 10,092,036 B2 * | 10/2018 | Phillips | A24F 40/40 |
| 10,172,387 B2 * | 1/2019 | Davis | A24F 40/46 |
| 10,278,427 B2 * | 5/2019 | Buchberger | A61M 11/042 |
| 10,321,711 B2 * | 6/2019 | Henry, Jr. | A24F 40/65 |
| 10,595,561 B2 * | 3/2020 | DePiano | A24F 40/46 |
| 10,602,778 B2 * | 3/2020 | Hu | A61M 11/042 |
| 10,939,707 B2 * | 3/2021 | Hejazi | A24F 40/46 |
| 10,993,474 B2 * | 5/2021 | Matsumoto | A24F 47/00 |
| 11,372,153 B2 * | 6/2022 | Novak, III | H02J 7/0045 |
| 11,382,179 B2 * | 7/2022 | Clemens | A24F 40/44 |
| 11,785,990 B2 * | 10/2023 | DePiano | A24F 40/70 |
| | | | 392/397 |
| 2014/0261487 A1 * | 9/2014 | Chapman | A24F 40/70 |
| | | | 87/6 |
| 2018/0168233 A1 * | 6/2018 | DePiano | A24F 40/70 |
| 2020/0107585 A1 * | 4/2020 | Atkins | H05B 3/42 |
| 2022/0007724 A1 * | 1/2022 | Zhang | A24F 40/10 |
| 2022/0039470 A1 * | 2/2022 | Courbat | A24F 40/46 |
| 2022/0192270 A1 * | 6/2022 | Zeng | A24F 40/485 |
| 2022/0248764 A1 * | 8/2022 | Li | A24F 40/485 |
| 2022/0369707 A1 * | 11/2022 | Lee | A24F 40/42 |
| 2023/0143680 A1 * | 5/2023 | Lee | A24F 40/30 |
| | | | 131/329 |

FOREIGN PATENT DOCUMENTS

| | | |
|---|---|---|
| CN | 207784278 U | 8/2018 |
| CN | 208425527 U | 1/2019 |
| CN | 109349680 A | 2/2019 |
| CN | 208550033 U | 3/2019 |
| CN | 210203316 U | 3/2020 |
| GB | 2513635 A | 11/2014 |
| RU | 2608915 A | 3/2016 |
| WO | 2017139963 A1 | 8/2017 |

* cited by examiner

CARTRIDGE AND ELECTRONIC CIGARETTE

TECHNICAL FIELD

The present disclosure relates to the technical field of smoking sets, and in particular to a cartridge and an electronic cigarette containing the same.

BACKGROUND

Electronic cigarette is an electronic product simulating traditional cigarettes, which has the same look, smoke, taste and feeling as the traditional cigarette. The electronic cigarette changes an atomized liquid containing nicotine and the like into a vapor for a user to inhale, through atomizing and other means. Since the electronic cigarettes are easy to carry, generate no open flame and are environment friendly, they become a popular choice for many smokers.

An electronic cigarette generally includes a liquid storage part, a porous body, a heating body and a battery, wherein a liquid storage cavity is formed in the liquid storage part to store an atomized liquid, the porous body is configured for absorbing partial atomized liquid from the liquid storage cavity and temporarily storing it, the heating body contacts the porous body, and the heating body, when electrified, heats the atomized liquid transferred to the heating body from the porous body to form an aerosol for a user to directly inhale, then the aerosol enters the user's mouth through the gas outlet channel to bring a sense of stimulation and satisfaction to the user; the battery is mainly configured for supplying power to the heating body.

A Chinese patent with application number of 201721713285.9 provides an electronic cigarette and an atomizer thereof, wherein the porous body (referred to as a liquid conductor in the patent) has a liquid absorption surface facing towards the liquid storage cavity and an atomizing surface located outside the liquid storage cavity, the heating body (referred to as a heating element in the patent) is formed on the atomizing surface, the liquid absorption surface defines a groove configured for storing partial atomized liquid, such that the shortest conduction distance of the atomized liquid from the bottom wall of the groove to the atomizing surface is less than the shortest conduction distance from the liquid absorption surface to the atomizing surface, so that the porous body increases the speed of transferring the atomized liquid to the atomizing surface, thereby improving the speed of the electronic cigarette generating an aerosol.

The inventor finds a following problem in the process of implementing the above application. During the smoking process of the electronic cigarette, when passing the cold gas outlet channel, the aerosol of 200 degrees centigrade will partially liquified to form a condensed liquid on the inner wall of the gas outlet channel; if the user inhales the condensed liquid, the smoking experience of the user will be degraded; if the user shakes the condensed liquid out of the gas outlet channel, resource waste will be resulted.

SUMMARY

In order to solve the problems in the prior art that users are likely to inhale a condensed liquid, which affects user experience, or resource is wasted after the condensed liquid is shaken out, the present disclosure provides a cartridge and an electronic cigarette having the same, which can recycle the condensed liquid, such that the user does not inhale the condensed liquid.

First, the present disclosure provides a cartridge, which includes:

a liquid storage part, inside of which a liquid storage cavity is formed to store an atomized liquid;

a gas outlet channel, through which an aerosol generated inside the cartridge is discharged to the outside of the cartridge;

a porous body, which includes a main body having an atomizing surface, and two side parts arranged opposite to each other and extending from an opposite surface of the atomizing surface in a direction away from the atomizing surface, wherein a container is defined and formed between the two side parts and the main body to contain partial atomized liquid, the container is communicated with the liquid storage cavity, and the porous body also includes a connection part which is used to connect the two side parts; and a heating body, which is arranged on the atomizing surface, wherein the heating body is configured for heating partial atomized liquid transferred from the container to the atomizing surface to form an aerosol for a user to inhale.

Compared with the prior art, the container to contain partial atomized liquid is formed between the two side parts and the main body of the porous body, which reduces the shortest conduction distance of the atomized liquid being transferred to the atomizing surface, and guarantees the liquid conduction rate of the porous body; furthermore, the connection part connecting the two side parts is communicated with the gas outlet channel, so that the condensed liquid formed by the atomized liquid on the inner wall of the gas outlet channel may be absorbed by the connection part and transferred to the atomizing surface to be atomized again, which not only reduces the risk of a user inhaling the condensed liquid, but also achieves the two-time utilization of the condensed liquid, thus preventing resource waste.

Optionally, the connection part is configured for receiving and absorbing a condensed liquid formed in the gas outlet channel, and the connection part has at least one receiving surface facing towards the gas outlet channel.

Optionally, the receiving surface of the connection part is parallel to a bottom surface of the container.

Optionally, the porous body has a first direction extending along the length direction; in the first direction, two opposite ends of the container are openings, and the connection part is located between the two openings.

In the length direction of the porous body, two opposite ends of the container are openings, which on one hand saves the material of the porous body, and on the other hand is conducive to the demolding of a male die during the molding process of the porous body, thereby being beneficial to the manufacturing and molding of the porous body and reducing the molding difficulty and manufacturing cost of the porous body.

Optionally, the cartridge further includes a first sealing element, wherein the porous body is accommodated in the first sealing element, the first sealing element includes two sealing parts, and the two sealing parts extend into the two openings to seal the two ends of the container respectively.

Optionally, a gap is defined between the sealing part and the connection part to form a liquid inlet which is configured for intercommunicating the container and the liquid storage part.

Optionally, the two side parts are provided with bevels which are extending from the connection part towards two ends of the porous body.

The bevels on the two side parts that are extending from the connection part towards the two ends greatly reduce the phenomenon of stress concentration at the connection of the side part and improves the rigidity of the side part near the opening end.

Optionally, the length of the two side parts extending along the first direction is less than the length of the main body in the first direction.

Optionally, the liquid storage part is internally provided with a gas guide tube which forms the gas outlet channel; the cartridge further includes a support which is configured for accommodating the porous body and the heating body, the support includes a concave part connected to the gas guide tube, the connection part abuts against the concave part in a sealing manner, and a bottom wall of the concave part defines a first intercommunicating pore which is configured for guiding a condensed liquid formed inside the gas outlet channel onto the receiving surface.

Optionally, a side wall of the concave part defines at least one air pore, and an aerosol generated on the heating body enters the gas outlet channel through the air pore.

Optionally, the porous body has a first direction extending along the length direction; in the first direction, the length of the connection part is less than the length of the side part, such that both sides of the container between the two side parts form an opening.

Optionally, the main body presents a tablet shape, one surface of the main body forms the atomizing surface, and in a direction perpendicular to the atomizing surface, the container has a depth greater than a thickness of the main body.

Second, the present disclosure provides an electronic cigarette, including a cartridge and a battery rod assembly, wherein the battery rod assembly contains a battery configured for supplying power to the cartridge, at least one part of the cartridge is accommodated in the battery rod assembly, wherein the cartridge is any one cartridge described above.

The present disclosure also provides a heater configured for heating an atomized liquid in an electronic cigarette, including:

a porous body, which includes a main body having an atomizing surface, and two side parts arranged opposite to each other and extending from an opposite surface of the atomizing surface in a direction away from the atomizing surface, wherein a container is defined and formed between the two side parts and the main body to contain partial atomized liquid, the porous body also includes a connection part which is used to connect the two side parts; wherein the porous body has a first direction extending along the length direction; in the first direction, the length of the connection part is less than the length of the side part, such that both sides of the container between the two side parts form an opening; and a heating body, which is arranged on the atomizing surface, wherein the heating body is configured for heating partial atomized liquid transferred from the container to the atomizing surface to form an aerosol for a user to inhale.

Optionally, the heating body includes any one of a heating sheet, a heating net and a heating film that are arranged on the atomizing surface, or a heating coating formed on the atomizing surface, or a heating track formed on the atomizing surface.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form restrictions unless otherwise stated.

DESCRIPTION OF DESIGNATORS IN DRAWINGS

Figure 1:
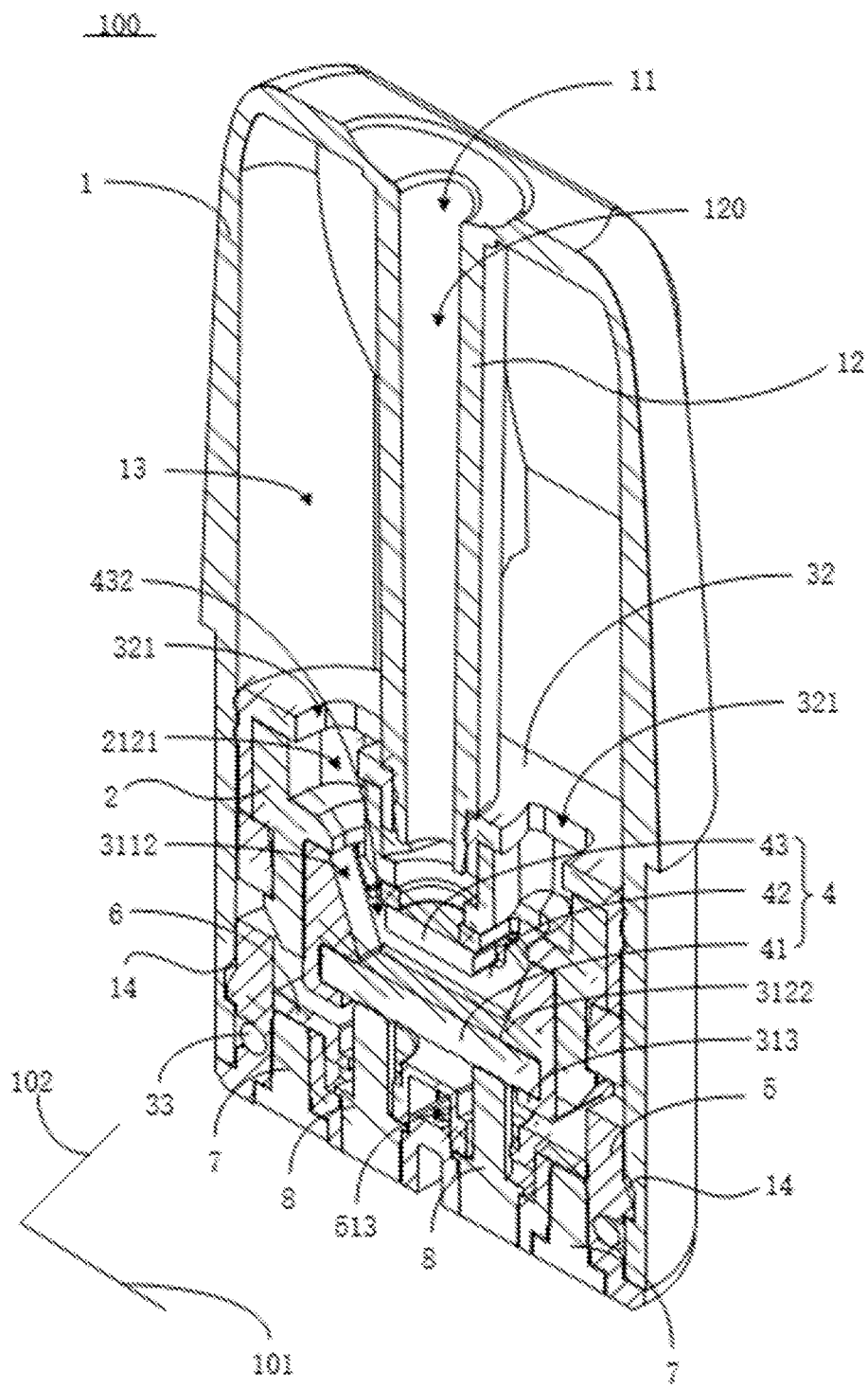
FIG. 1 is a stereoscopic sectional view of a cartridge according to one embodiment of the present disclosure.

| Cartridge 100 | First direction 101 | Second direction 102 | Liquid storage part 1 |
| --- | --- | --- | --- |
| Gas outlet port 11 | Gas guide tube 12 | Gas outlet channel 120 | Liquid storage cavity 13 |
| First clamping groove 14 | Support 2 | First main body 21 | Concave part 212 |
| First intercommunicating pore 210 | Air pore 211 | First liquid flowing hole 2121 | First cylinder 22 |
| Second clamping protrusion 221 | First vent groove 222 | First sealing element 31 | Third main body 311 |

| | | | |
|---|---|---|---|
| Second intercommunicating pore 3111 | Third liquid flowing hole 3112 | Third cylinder 312 | Second vent groove 3121 |
| Sealing part 3122 | First clamping part 313 | Second sealing element 32 | Second liquid flowing hole 321 |
| Third sealing element 33 | Porous body 4, 4a | Main body 41, 41a | Atomizing surface 411 |
| Side part 42, 42a | Connection part 43, 43a | Receiving surface 431 | Liquid inlet 432 |
| Container 44 | Heating body 45 | Base 5 | Second main body 51 |
| Electrode stem mounting hole 511 | Magnetic column mounting hole 512 | Air inlet 513 | Second cylinder 52 |
| First clamping protrusion 521 | Third sealing groove 522 | Abutting wall 53 | Second clamping groove 531 |
| Liquid isolator 6 | Magnetic column 7 | Electrode stem 8 | |

DETAILED DESCRIPTION

For a better understanding of the present disclosure, a more detailed description is provided to the present disclosure in conjunction with the drawings and specific embodiments. It is to be noted that when an element is described as "fixed on" another element, it may be directly on the another element, or there might be one or more intermediate elements between them. When one element is described as "connected to" another element, it may be directly connected to the another element, or there might be one or more intermediate elements between them. Terms "upper", "lower", "left", "right", "inner", "outer" and similar expressions used in this description are merely for illustration.

Unless otherwise defined, all technical and scientific terms used in the description have the same meaning as those normally understood by the skill in the technical field of the present disclosure. The terms used in the description of the present disclosure are just for describing specific implementations, not to limit the present disclosure. Terms "and/or" used in the description include any and all combinations of one or more listed items.

The atomized liquid mentioned in the present disclosure may be a tobacco liquid, a liquid pharmaceutical ingredient or other aromatic substances volatile under heating.

An electronic cigarette provided by the present disclosure mainly includes a cartridge 100 and a battery rod assembly (not shown), wherein the battery rod assembly includes a battery rod shell (not shown) and a battery (not shown) accommodated in the battery rod shell, the battery is mainly configured for supplying power to the cartridge 100, such that a heating body 45 in the cartridge 100 is electrified to heat an atomized liquid inside the cartridge 100 into an aerosol for a user to directly inhale, at least one part of the cartridge 100 is accommodated in the battery rod shell, that is, at least one part of the cartridge 100 is accommodated in the battery rod assembly.

Figure 2:
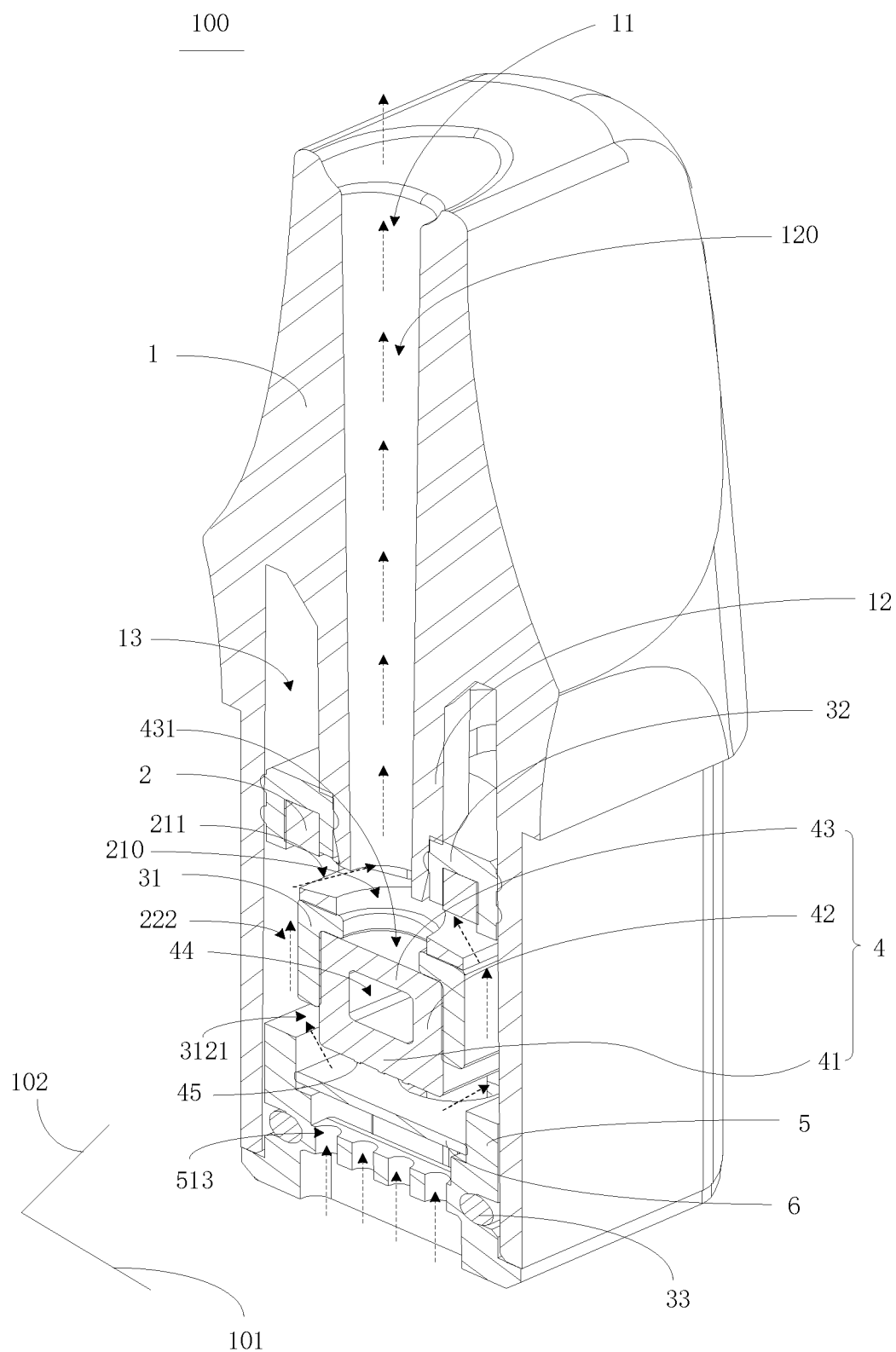
FIG. 2 is another stereoscopic sectional view of a cartridge according to one embodiment of the present disclosure.
Figure 3:
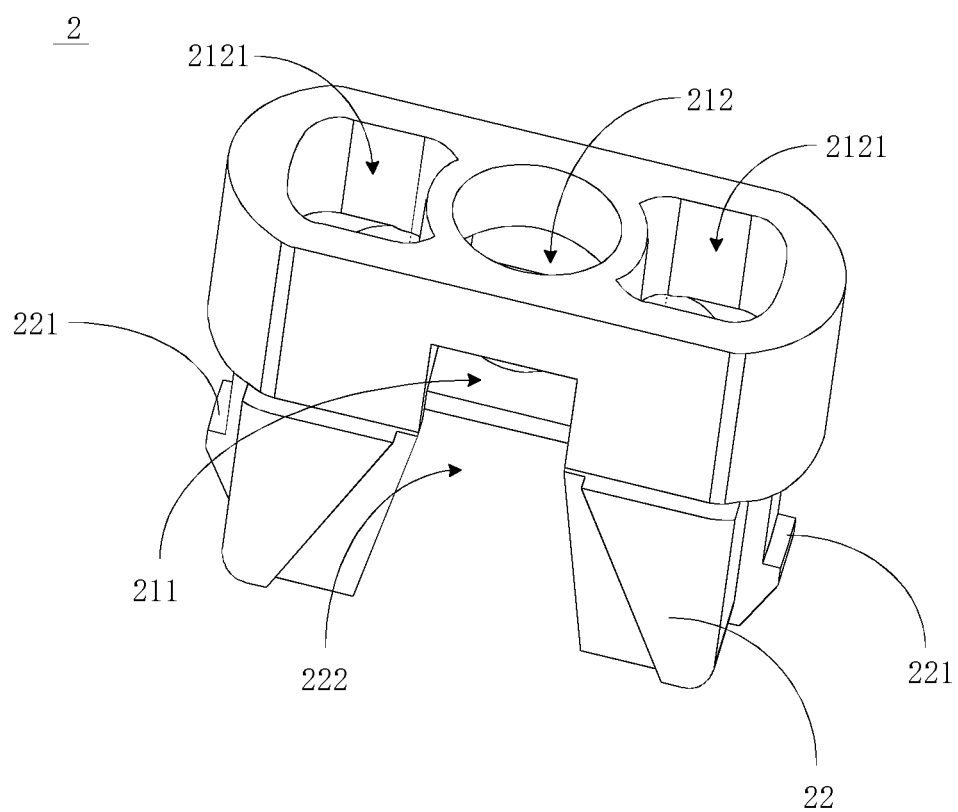
FIG. 3 is a stereoscopic view of a support of a cartridge according to one embodiment of the present disclosure.
Figure 4:
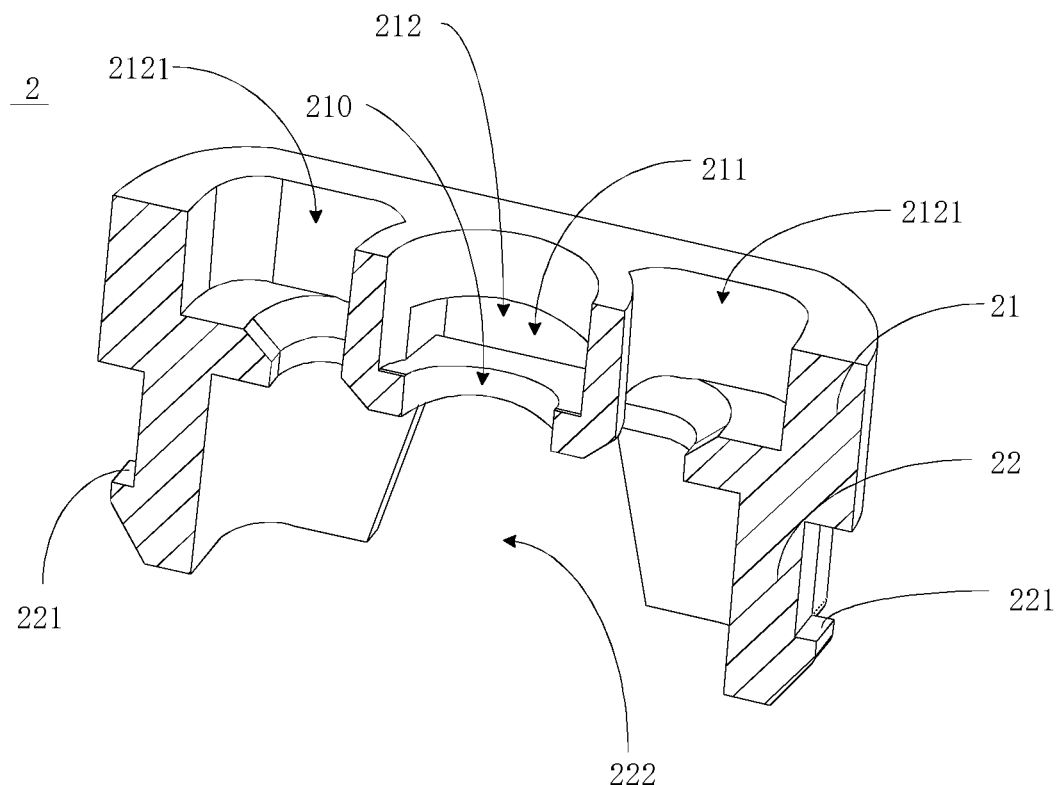
FIG. 4 is a stereoscopic sectional view of a support of a cartridge according to one embodiment of the present disclosure.

As shown in FIG. 1 and FIG. 2, a cartridge 100 provided in one embodiment of the present disclosure mainly includes a liquid storage part 1, a support 2, a first sealing element 31, a second sealing element 32, a third sealing element 33, a porous body 4, a heating body 45, a base 5, a liquid isolator 6, a magnetic column 7 and an electrode stem.

For convenient description, a first direction 101 and a second direction 102 are defined that are perpendicular to each other, wherein the first direction 101 is a horizontal direction running through left and right sides of the cartridge 100, the second direction 102 is a horizontal direction running through the front and rear sides of the cartridge 100, that is to say, the first direction 101 is a width direction of the cartridge, and the second direction 102 is a thickness direction of the cartridge 100.

The liquid storage part 1 is a tablet elongated structure, that is, the length of the liquid storage part 1 is greater than the width, and the width is greater than the thickness. An upper end of the liquid storage part 1 defines a gas outlet port 11, and a lower end of the liquid storage part 1 is an opening. A gas guide tube 12 is extended downwards from an upper end of an inner wall of the liquid storage part 1, and a gas outlet channel 120 is formed in the gas guide tube 12, an upper end of the gas outlet channel 120 is communicated with the gas outlet port 11, and a liquid storage cavity 13 is formed between the outer side of the gas guide tube 12 and the inner side of the liquid storage part 1 to store an atomized liquid. A first clamping groove 14 is defined on left and right sides of the lower side of the inner wall of the liquid storage part 1 respectively.

The liquid storage part 1 is made of a rigid plastic material. The liquid storage part 1 is made of at least one of phenolic plastic, polyurethane plastic, epoxy plastic, unsaturated polyester plastic, furan plastic, and relevant plastics made from organic silicon resin, acrylic resin, and their modified resins.

As shown in FIG. 1, FIG. 2, FIG. 3 and FIG. 4, the support 2 is accommodated in the liquid storage part 1, the support 2 includes a first main body 21 and a first cylinder 22, and the support 2 is made of a rigid plastic material. The support 2 is made of at least one of phenolic plastic, polyurethane plastic, epoxy plastic, unsaturated polyester plastic, furan plastic, and relevant plastics made from organic silicon resin, acrylic resin, and their modified resins.

A concave part 212 is defined downwards from a center of an upper surface of the first main body 21, a bottom wall of the concave part 212 defines a first intercommunicating pore 210, and a lower end of the gas guide tube 12 is accommodated in the concave part 212. In the second direction, two opposite side walls of the concave part 212 define one air pore 211 respectively, such that the gas outlet channel 120 in the gas guide tube 12 is communicated with the outside of the support 2 via the air pore 211. In the first direction 101, the first main body 21 defines two spaced first liquid flowing holes 2121 that pass through the upper and lower surfaces of the first main body 21, wherein the two first liquid flowing holes 2121 are located on the left and right sides of the concave part 212 respectively.

The first cylinder 22 is formed by extending downwards from an outer edge of a lower surface of the first main body 21. The first cylinder 22 is a closed ring, a lower end of the first cylinder 22 is an opening, the first liquid flowing hole 2121 intercommunicates the spaces in the liquid storage cavity 13 and in the first cylinder 22. In the first direction 101, left and right sides of the first cylinder 22 are provided with a second clamping protrusion 221 respectively. In the second direction 102, the first cylinder 22 defines two first vent grooves 222, the two first vent grooves 222 are communicated with the two air pores 211 respectively, thereby communicating with the gas outlet channel 120 in the gas guide tube 12.

The second sealing element 32 is sleeved on the first main body 21; the second sealing element 32 is made of a silicone material, which is sealed between the main body 21 of the support 2 and the inner wall of the liquid storage part 1; the above liquid storage cavity 13 is enclosed between the first main body 21, the second sealing element 32, the gas guide tube 12 and the inner wall of the liquid storage part 1. The second sealing element 32 defines two second liquid flowing holes 321 that intercommunicate the liquid storage cavity 13 and the first liquid flowing holes 2121. In the present embodiment, the second sealing element 32 is made of a silicone material. It is understandable that in some other embodiments the second sealing element 32 may also be made of other materials with sealing and isolating properties.

Figure 5:
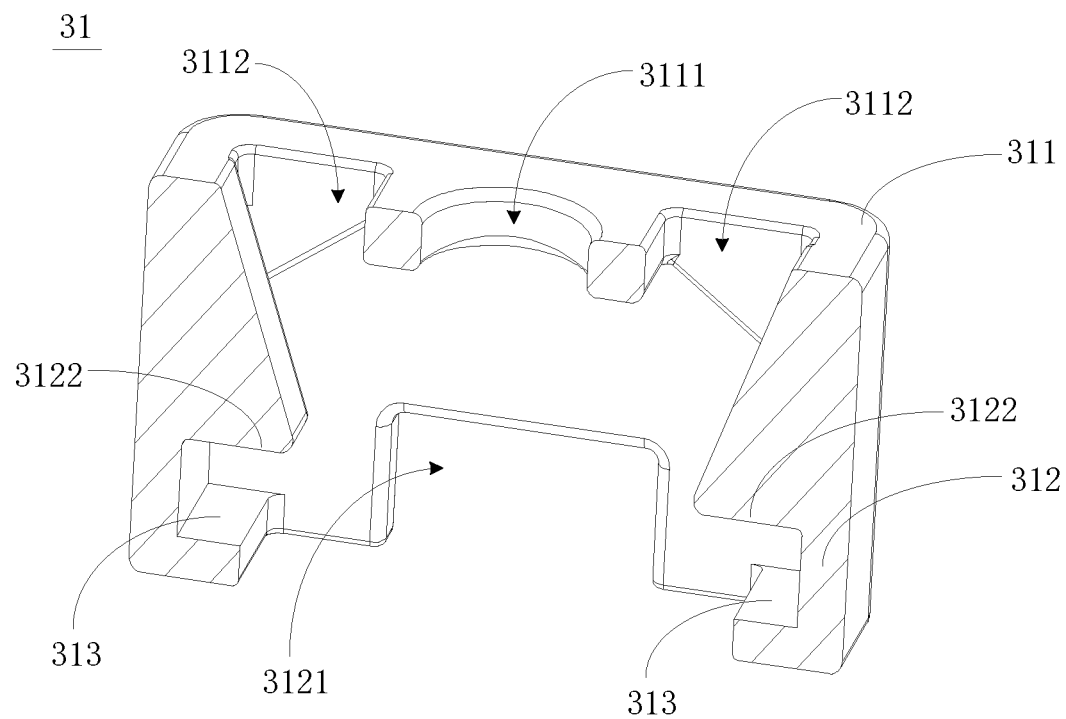
FIG. 5 is a stereoscopic sectional view of a first sealing element of a cartridge according to one embodiment of the present disclosure.
Figure 6:
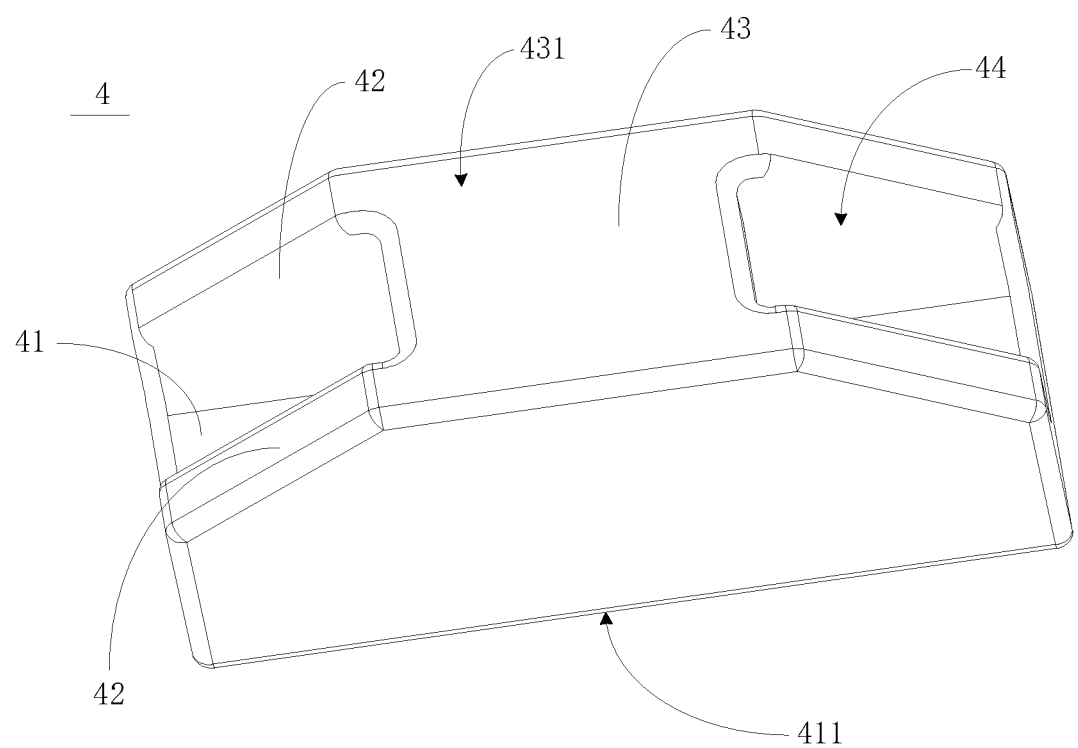
FIG. 6 is a stereoscopic view of a porous body of a cartridge according to one embodiment of the present disclosure.
Figure 7:
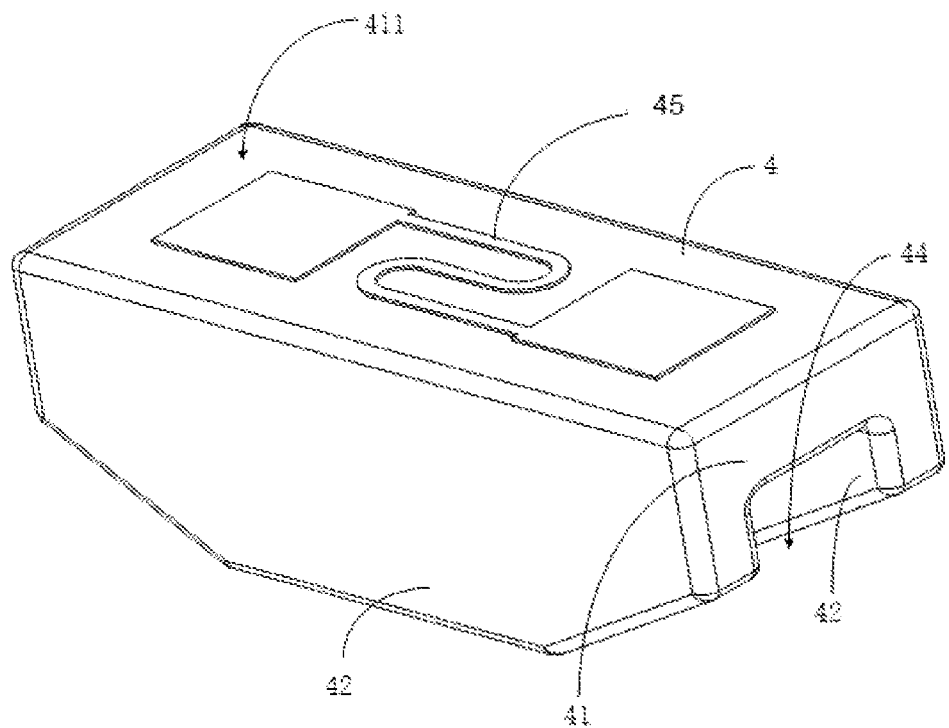
FIG. 7 is a stereoscopic combination view of a porous body and a heating body of a cartridge according to one embodiment of the present disclosure.
Figure 8:
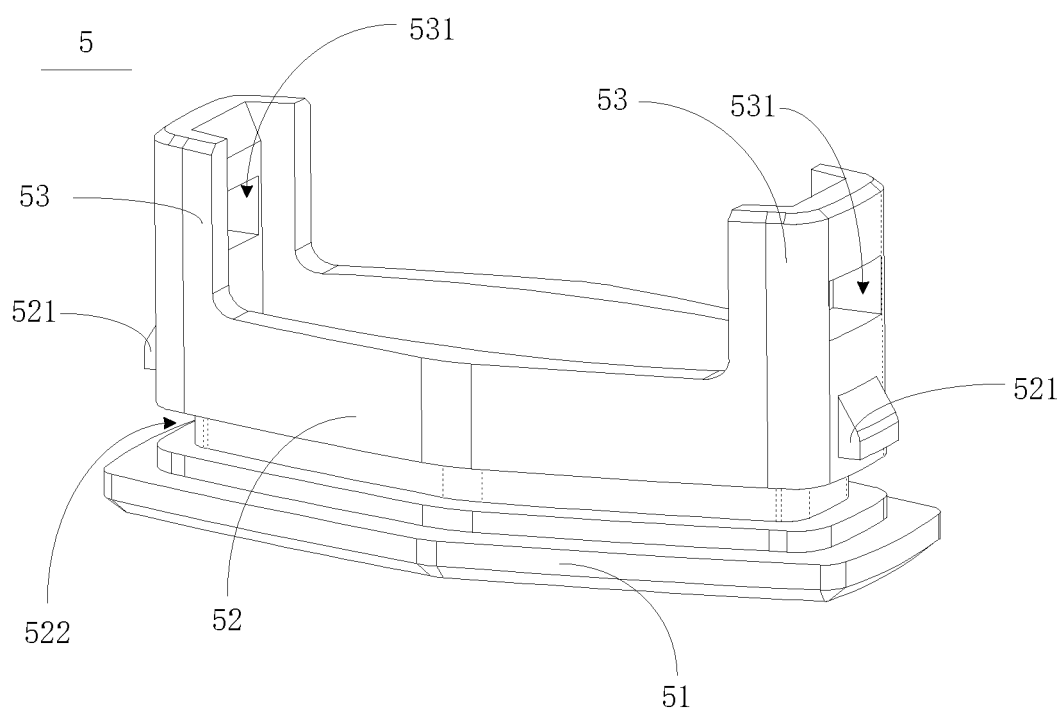
FIG. 8 is a stereoscopic view of a base of a cartridge according to one embodiment of the present disclosure.
Figure 9:
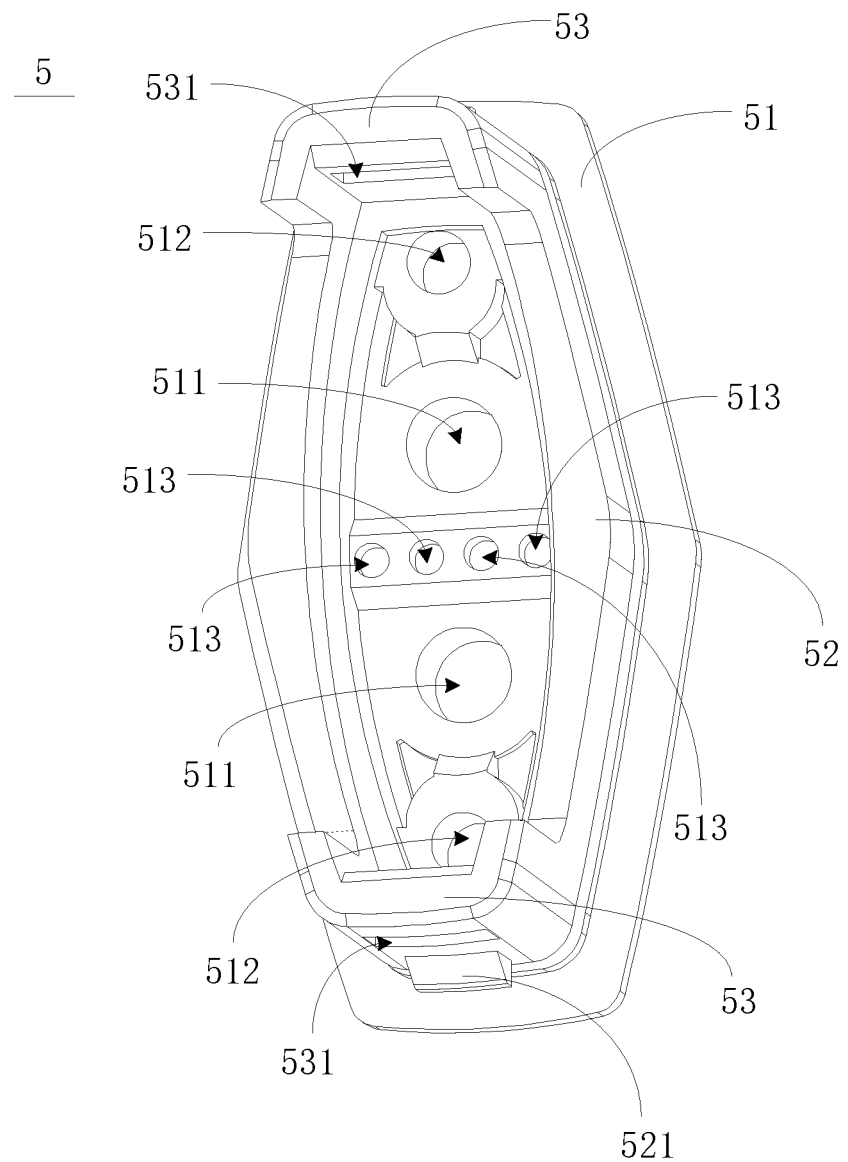
FIG. 9 is another stereoscopic view of a base of a cartridge according to one embodiment of the present disclosure.

As shown in FIG. 2, FIG. 2 and FIG. 5, the first sealing element 31 is a hollow structure with an opening on one end, and the first sealing element 31 is mostly accommodated in the first cylinder 22. The first sealing element 31 incudes a third main body 311, a third cylinder 312 and a first clamping part 313. The third main body 311 presents a tablet shape, an upper end surface of the third main body 311 abuts against a lower end surface of the first cylinder 22, the third main body 311 defines at a center a second intercommunicating pore 3111 that passes through upper and lower sides of the third main body 311, the second intercommunicating pore 3111 is communicated with the first intercommunicating pore 210. In the first direction 101, the third main body 311 defines two spaced third liquid flowing holes 3112, and the two third liquid flowing holes 3112 are communicated with the two first liquid flowing holes 2121 respectively. The third cylinder 312 is formed by extending from an outer edge of a lower surface of the third main body 311 towards a direction away from the first main body 21. In the lengthwise direction of the cartridge 100, the lower surface of the third main body 311 is lower than the lower surface of the first cylinder 22. In the second direction 102, the third cylinder 312 defines two second vent grooves 3121, and the two second vent grooves 3121 are communicated with the two first vent grooves 222 respectively.

In the first direction 101, an inner wall of the third cylinder 312 is provided with two sealing parts 3122, an inner wall of the third cylinder 312 is provided with two first clamping parts 313, the two first clamping parts 313 are located below the two sealing parts 3122, and the two first clamping parts 313 connect two sides of the third cylinder 312 in the second direction 102.

In the present embodiment, the first sealing element 31 is made of a silicone material. It is understandable that in some other embodiments the first sealing element 31 may also be made of other materials with sealing and isolating properties.

As shown in FIG. 1, FIG. 2, FIG. 6 and FIG. 7, the porous body 4 mainly includes a main body 41, two side parts 42 and a connection part 43, wherein the main body 41 presents a tablet shape, the length of the main body 41 in the first direction 101 is greater than the length in the second direction 102, that is, the length direction of the main body 41 is consistent with the first direction 101. One surface of the main body 41 is an atomizing surface 411, the two side parts 42 are formed by extending from an opposite surface of the atomizing surface 411 in a direction away from the atomizing surface 411, a container 44 is defined and formed between the two side parts 42 and the main body 41 to contain partial atomized liquid, the container 44 has a depth greater than a thickness of the main body 41, that is, in a direction perpendicular to the atomizing surface 411, the side part 42 has a length greater than that of the main body 41. In the first direction 101, the connections at two ends of the two side parts 42 in the first direction 101 are provided with bevels, that is, top surfaces of the two side parts 42 from the connection part 43 towards two ends of the porous body 4 are bevels, which avoids the occurrence that the connection of the side part 42 is damaged due to stress concentration during molding and improves the completeness of the side part 42.

The connection part 43 is used to connect the two side parts 42, to enhance the rigidity of the two side parts 42; an upper surface of the connection part 43 is a receiving surface 431, the receiving surface 431 is parallel to a bottom surface of the container 44, and the receiving surface 431 is facing towards the gas outlet channel 120, to receive a condensed liquid formed in the gas outlet channel 120 and then transfer the condensed liquid onto the atomizing surface 411 of the main body 41 via the side part 42 to atomize again. The receiving surface 431 abuts against an end surface of the third main body 311, and the connection part 43 is communicated with the second intercommunicating pore 3111, thereby communicating with the gas outlet channel 120 in the gas guide tube 12; when an aerosol is liquified to form a condensed liquid on an inner wall of the gas guide tube 12, the formed condensed liquid may pass through the first intercommunicating pore 210 and the second intercommunicating pore 3111 in sequence to be absorbed by the connection part 43, which reduces the risk of the user inhaling a condensed liquid.

In the first direction 101, the length of the connection part 43 is less than the length of the side part 42, both sides of the container are openings, the two sealing parts 3122 on the first sealing element 31 extend into the two openings of the container 44 respectively, to seal the container 44. A gap is defined between the two sealing parts 3122 and the connection part 43 to form a liquid inlet 432 which is configured for intercommunicating the container 44 and the liquid storage cavity 13. A lower end surface of the sealing part 3122 abuts against a bottom surface of the container 44, an upper end surface of the first clamping part 313 abuts against the atomizing surface 411, so that the main body 41 is clamped between the sealing part 3122 and the first clamping part 313, the relative installation between the porous body 4 and the first sealing element 31 is limited, which not only facilitates the installation between the porous body 4 and the first sealing element 31, but also prevents the porous body 4 separating from the first sealing element 31, and guarantees the effective sealing of the first sealing element 31 to the porous body 4. The porous body 4 is accommodated in the first sealing element 31, that is, the porous body 4 is accommodated in the third cylinder 312.

The porous body 4 is mainly configured for conducting the atomizing liquid in the liquid storage cavity 13 onto the atomizing surface 411, that is, the porous body 4 is mainly configured for conduction; in the present embodiment, the porous body 4 is made of a porous ceramic material; it is understandable that in some other embodiments the material for preparing the porous body 4 also may be at least one of the porous materials having micropore capillary effects, such as foam metal, porous glass, rigid fiberglass pipe, etc.

The heating body 45 is integrated on the atomizing surface of the porous body 4; in the present embodiment, the heating body 45 is a resistance paste printed on the atomizing surface 411 according to a line track. It is understandable that in some other embodiments the heating body 45 also may be a heating sheet, a heating net and a heating film, or a heating coating or heating track formed on the atomizing surface 411. The material of the heating body 45 may be a metal material, a metal alloy, a graphite, a carbon, a conductive ceramic with an appropriate impedance or a composite of other ceramic materials and a metal material. The metal or alloy material with an appropriate impedance includes at least one of nickel, cobalt, zirconium, titanium, nickel alloy, cobalt alloy, zirconium alloy, titanium alloy, nickel-chromium alloy, ferro-nickel alloy, ferrochrome alloy, ferrochrome aluminum alloy, titanium alloy, ferro-aluminum-manganese base alloy or stainless steel.

As shown in FIG. 1, FIG. 2, FIG. 8 and FIG. 9, the base 5 is made of a rigid plastic material, the base 5 includes a second main body 51, a second cylinder 52 and two abutting walls 53.

The second main body 51 approximately presents a tablet shape, a lower end surface of the second main body 51 is perpendicular to the lengthwise direction of the cartridge 100, the second main body 51 defines two electrode stem mounting holes 511 and two magnetic column mounting holes 512, both the electrode stem mounting hole 511 and the magnetic column mounting hole 512 are through holes. In the first direction 101, the two magnetic column mounting holes 512 are located outside the two electrode stem mounting holes 511 respectively. In the lengthwise direction of the cartridge 100, a gap is reserved between the second main body 51 and the support 2. The second main body 51 defines four air inlets 513, the four air inlets 513 pass through upper and lower sides of the second main body 51, the four air inlets 513 are distributed along the second direction, that is, a connection line between centers of the four air inlets 513 is parallel to the second direction 102, and the four air inlets 513 are located between the two electrode stem mounting holes 511.

The second cylinder 52 represents a ring shape, the second cylinder 52 is formed by extending upwards from the second main body 51, a step is formed between an outer side of the second cylinder 52 and the second main body 51, and a lower end of the liquid storage part 1 abuts against the step. In the first direction 101, left and right sides of the second cylinder 52 are provided with a first clamping protrusion 521 respectively, the first clamping protrusion 521 is adapted to the first clamping groove 14, thereby realizing the fixing between the base 5 and the liquid storage part 1. An outer side of the second cylinder 52 defines a ring shaped third sealing groove 522, the third sealing groove 522 is located below the first clamping protrusion 521. The third sealing element 33 is accommodated in the third sealing groove 522, to seal the gap between the second cylinder 52 and the liquid storage part 1. The third sealing element 33 is made of a silicone material.

As shown in figures, the two abutting walls 53 are formed by extending upwards from left and right sides of the second cylinder 52 respectively, upper end surfaces of the two abutting walls 53 abut against a lower end surface of the first main body 21, thereby realizing the lengthwise location between the base 5 and the support 2. Each of the abutting walls 53 defines a second clamping groove 531, the second clamping groove 531 is adapted to the second clamping protrusion 221, thereby realizing the fixed connection between the base 5 and the support 2.

Two magnetic columns 7 are accommodated in the two magnetic column mounting holes 512 respectively, and the two magnetic columns 7 have a same structure. The magnetic column 7 is made of a ferro magnetic material, for example, the magnetic column 7 may be made of at least one of iron, ferroalloy, molybdenum, molybdenum alloy, nickel, or nickel alloy, such that the magnetic column 7 can be magnetized by a permanent magnet.

Two electrode stems 8 are accommodated in the two electrode stem mounting holes 511 respectively, upper ends of the two electrode stems 8 abut against the heating body 45 respectively, the two electrode stems 8 are configured for electrically connecting the heating body 45 and the battery rod assembly. The electrode stem 8 is made of a material with high conductivity, for example, the electrode stem 8 may be made of at least one of gold, gold alloy, silver, silver alloy, copper or copper alloy.

The liquid storage part 1, the support 2 and the base 5 are made of at least one of phenolic plastic, polyurethane plastic, epoxy plastic, unsaturated polyester plastic, furan plastic, and relevant plastics made from organic silicon resin, acrylic resin, and their modified resins.

The liquid isolator 6 is made of a silicone material, the liquid isolator 6 is located between the second main body 51 and the atomizing surface 411, a gap is reserved between the liquid isolator 6 and the atomizing surface 411, the gap forms a release space, the heating body 45 is electrified to heat the atomized liquid on the atomizing surface 411 to form an aerosol which is then released into the release space. The liquid isolator 6 defines two through holes for the two electrode stems 8 to pass through to contact the heating body 45, a gap is reserved between the two through holes on the liquid isolator 6 and the electrode stems 8, such that external fresh air enters the release space through the air inlet 513 and the gap in sequence. Through arranging the liquid isolator 6 on the air inlet 513, the atomized liquid leaked from the atomizing surface 411 is prevented from directly leaking out of the cartridge 100 via the air inlet 513, which further guarantees user experience.

After the cartridge 100 is inserted into the battery rod assembly to form an electronic cigarette, when a user produces a smoking action at the gas outlet port 11 of the liquid storage part 1, the heating body 45 is electrically connected to the battery, then the heating body 45 heats the atomized liquid on the atomizing surface 411 of the porous body 4 to form an aerosol for a user to directly inhale, then external fresh air enters the release space via an air inlet hole (not shown) on the battery rod assembly, the air inlets 513, and the gap between the through hole on the liquid isolator 6 and the electrode stem 8 in sequence, to carry the aerosol generated in the release space to enter the gas outlet channel 120 via the second vent groove 3121, the first vent groove 222 and the air pore 211 in sequence, and finally the aerosol enters the user's mouth through the gas outlet port 11 to bring a sense of stimulation and satisfaction to the user.

Figure 10:
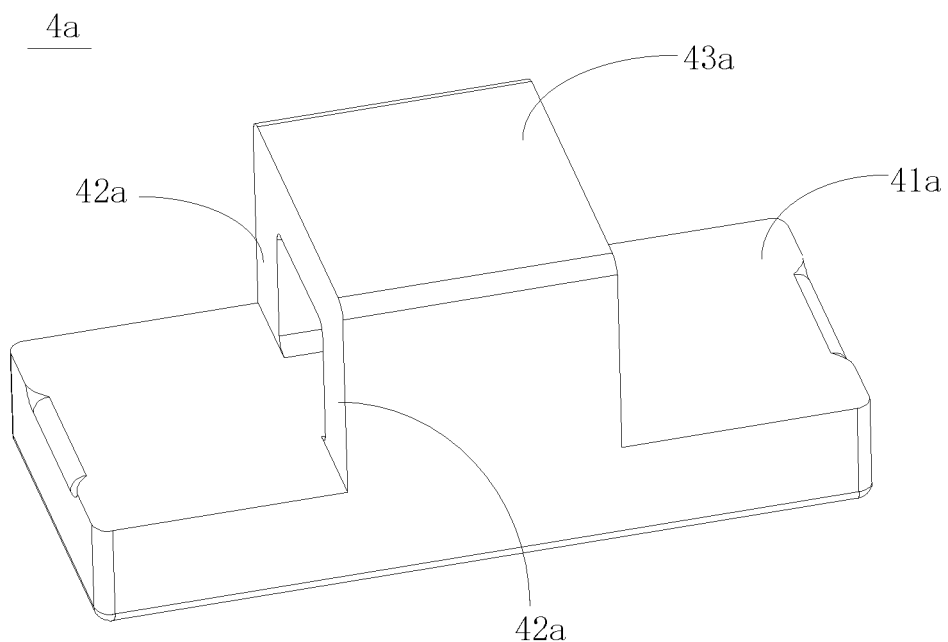
FIG. 10 is a stereoscopic view of a porous body of a cartridge according to another embodiment of the present disclosure.

As shown in FIG. 10, another embodiment of the present disclosure provides a porous body 41, which has a following significant distinction from the porous body 4 described in one embodiment: in the length direction of the porous body 4a, the two side parts 42a have a smaller length than the length of the main body 41, and the lengths of the two side parts 42a are equal to the length of the connection part 43a, which on one hand enables the porous body 4a to be easier to mold and manufacture than the porous body 4, and on the other hand makes the side part 42a has a higher rigidity than the side part 42.

Compared with the prior art, the cartridge 100 and the electronic cigarette having the cartridge 100 provided in the present disclosure have at least the following beneficial effects.

The container 44 to contain partial atomized liquid is formed between the two side parts 42 and the main body 41 of the porous body 4, which reduces the shortest conduction distance of the atomized liquid being conducted to the atomizing surface 411; under the condition of guaranteeing the liquid conduction rate of the porous body 4, the connection part 43 is arranged to connect the two side parts 42; the connection part 43 on one hand enhances the rigidity of the two side parts 42, and on the other hand the connection part 43 is communicated with the gas outlet channel 120, so that the condensed liquid formed by the atomized liquid on the inner wall of the gas outlet channel 120 may be absorbed by the connection part 43 and transferred to the atomizing surface 411 to be atomized again, which not only reduces the risk of a user inhaling the condensed liquid, but also achieves the two-time utilization of the condensed liquid, thus preventing resource waste.

In the length direction of the porous body 4, two opposite ends of the container 44 are openings, which on one hand saves the material of the porous body 4, and on the other hand is conducive to the demolding of a male die during the molding process of the porous body 4, thereby being beneficial to the manufacturing and molding of the porous body 4 and reducing the molding difficulty and manufacturing cost of the porous body 4.

The main body 41 of the porous body 4 is clamped between the sealing part 3122 and the first clamping part 313, which not only facilitates the installation between the porous body 4 and the first sealing element 31, but also prevents the porous body 4 separating from the first sealing element 31, and guarantees the effective sealing of the first sealing element 31.

The liquid isolator 6 is arranged between the second main body 51 and the porous body 4, which avoids the fact that the atomized liquid leaked from the atomizing surface 411 directly leaks out of the cartridge 100 via the air inlet 513 on the second main body 51, thus, on one hand the atomized liquid is prevented leaking out of the cartridge 100 to affect user experience during the transportation or storage process of the cartridge 100, and on the other hand the leaked atomized liquid is prevented entering the battery rod assembly from the cartridge 100 to damage the electronic elements in the battery rod assembly.

It should be noted that although the description and accompanying drawings of the present disclosure illustrate some preferred embodiments of the present disclosure, the present disclosure may be implemented through many different forms, but not restricted to the embodiments described in the description. These embodiments shall not be construed as additional limitations on the contents of the present disclosure. These embodiments are described for the purpose of providing a more thorough and comprehensive understanding of the disclosed content of the present disclosure. Moreover, various embodiments not listed above formed by the above technical features combining with each other are all intended to be included in the scope of the present disclosure; furthermore, for the ordinary skill in the art, improvements or transformations may be made according to the above description, and these improvements and transformations shall belong to the protection scope of the claims appended below.

What is claimed is:

1. A cartridge, comprising:
   a liquid storage part, inside of which a liquid storage cavity is formed to store an atomized liquid;
   a gas outlet channel, through which an aerosol generated inside the cartridge is discharged to the outside of the cartridge;
   a porous body, which comprises a main body having an atomizing surface, and two side parts arranged opposite to each other and extending from an opposite surface of the atomizing surface in a direction away from the atomizing surface, wherein a container is defined and formed between the two side parts and the main body to contain partial atomized liquid, the container is communicated with the liquid storage cavity, and the porous body also comprises a connection part which is used to connect the two side parts; and
   a heating body, which is bound to the atomizing surface, wherein the heating body is configured for heating partial atomized liquid transferred from the container to the atomizing surface to form an aerosol for a user to inhale;
   wherein the porous body has a first direction extending along the length direction, in the first direction, openings are formed on two opposite ends of the container, the connection part is located between the two openings, and wherein the container is communicated with the liquid storage cavity through the openings.

2. The cartridge according to claim 1, wherein the connection part is configured for receiving and absorbing a condensed liquid formed in the gas outlet channel, and the connection part has at least one receiving surface facing towards the gas outlet channel.

3. The cartridge according to claim 2, wherein the receiving surface of the connection part is parallel to a bottom surface of the container.

4. The cartridge according to claim 1, further comprising a first sealing element, wherein the porous body is accommodated in the first sealing element, the first sealing element comprises two sealing parts, and the two sealing parts extend into the two openings to seal the two ends of the container respectively.

5. The cartridge according to claim 4, wherein a gap is defined between the sealing part and the connection part to form a liquid inlet which is configured for intercommunicating the container and the liquid storage part.

6. The cartridge according to claim 1, wherein the two side parts are provided with bevels which are extending from the connection part towards two ends of the porous body.

7. The cartridge according to claim 1, wherein the length of the two side parts extending along the first direction is less than the length of the main body in the first direction.

8. The cartridge according to claim 2, wherein the liquid storage part is internally provided with a gas guide tube which forms the gas outlet channel; the cartridge further comprises a support which is configured for accommodating the porous body and the heating body, the support comprises a concave part connected to the gas guide tube, the connection part abuts against the concave part in a sealing manner, and a bottom wall of the concave part defines a first intercommunicating pore which is configured for guiding a condensed liquid formed inside the gas outlet channel onto the receiving surface.

9. The cartridge according to claim 8, wherein a side wall of the concave part defines at least one air pore, and an aerosol generated on the heating body enters the gas outlet channel through the air pore.

10. The cartridge according to claim 1, wherein in the first direction, the length of the connection part is less than the length of the side part, such that both sides of the container between the two side parts form an opening.

11. The cartridge according to claim 1, wherein the main body presents a tablet shape, one surface of the main body forms the atomizing surface, and in a direction perpendicular to the atomizing surface, the container has a depth greater than a thickness of the main body.

12. An electronic cigarette, comprising a cartridge and a battery rod assembly, wherein the battery rod assembly contains a battery configured for supplying power to the cartridge, at least one part of the cartridge is accommodated in the battery rod assembly, wherein the cartridge is according to claim 1.

13. A heater configured for heating an atomized liquid in an electronic cigarette, comprising:
- a porous body, which comprises a main body having an atomizing surface, and two side parts arranged opposite to each other and extending from an opposite surface of the atomizing surface in a direction away from the atomizing surface, wherein a container is defined and formed between the two side parts and the main body to contain partial atomized liquid, the porous body also comprises a connection part which is used to connect the two side parts; wherein the porous body has a first direction extending along the length direction; in the first direction, the length of the connection part is less than the length of the side part, such that both sides of the container between the two side parts form an opening; and
- a heating body, which is bound to the atomizing surface, wherein the heating body is configured for heating partial atomized liquid transferred from the container to the atomizing surface to form an aerosol for a user to inhale
wherein the porous body has a first direction extending along the length direction, in the first direction, openings are formed on two opposite ends of the container, the connection part is located between the two openings.

14. The heater according to claim 13, wherein the heating body comprises any one of a heating sheet, a heating net and a heating film that are bound to the atomizing surface, or a heating coating formed on the atomizing surface, or a heating track formed on the atomizing surface.

15. The electronic cigarette according to claim 12, wherein the connection part is configured for receiving and absorbing a condensed liquid formed in the gas outlet channel, and the connection part has at least one receiving surface facing towards the gas outlet channel,
wherein the receiving surface of the connection part is parallel to a bottom surface of the container.

16. The electronic cigarette according to claim 12, wherein the cartridge further comprises a first sealing element, wherein the porous body is accommodated in the first sealing element, the first sealing element comprises two sealing parts, and the two sealing parts extend into the two openings to seal the two ends of the container respectively.

17. The electronic cigarette according to claim 15, wherein the liquid storage part is internally provided with a gas guide tube which forms the gas outlet channel; the cartridge further comprises a support which is configured for accommodating the porous body and the heating body, the support comprises a concave part connected to the gas guide tube, the connection part abuts against the concave part in a sealing manner, and a bottom wall of the concave part defines a first intercommunicating pore which is configured for guiding a condensed liquid formed inside the gas outlet channel onto the receiving surface,
wherein a side wall of the concave part defines at least one air pore, and an aerosol generated on the heating body enters the gas outlet channel through the air pore.

18. The electronic cigarette according to claim 12, wherein in the first direction, the length of the connection part is less than the length of the side part, such that both sides of the container between the two side parts form an opening.

19. The electronic cigarette according to claim 12, wherein the main body presents a tablet shape, one surface of the main body forms the atomizing surface, and in a direction perpendicular to the atomizing surface, the container has a depth greater than a thickness of the main body.

* * * * *